May 5, 1931. J. W. RUSH 1,803,770
TRACTOR HITCH FOR FARM MACHINERY
Filed Sept. 10, 1929 3 Sheets-Sheet 1
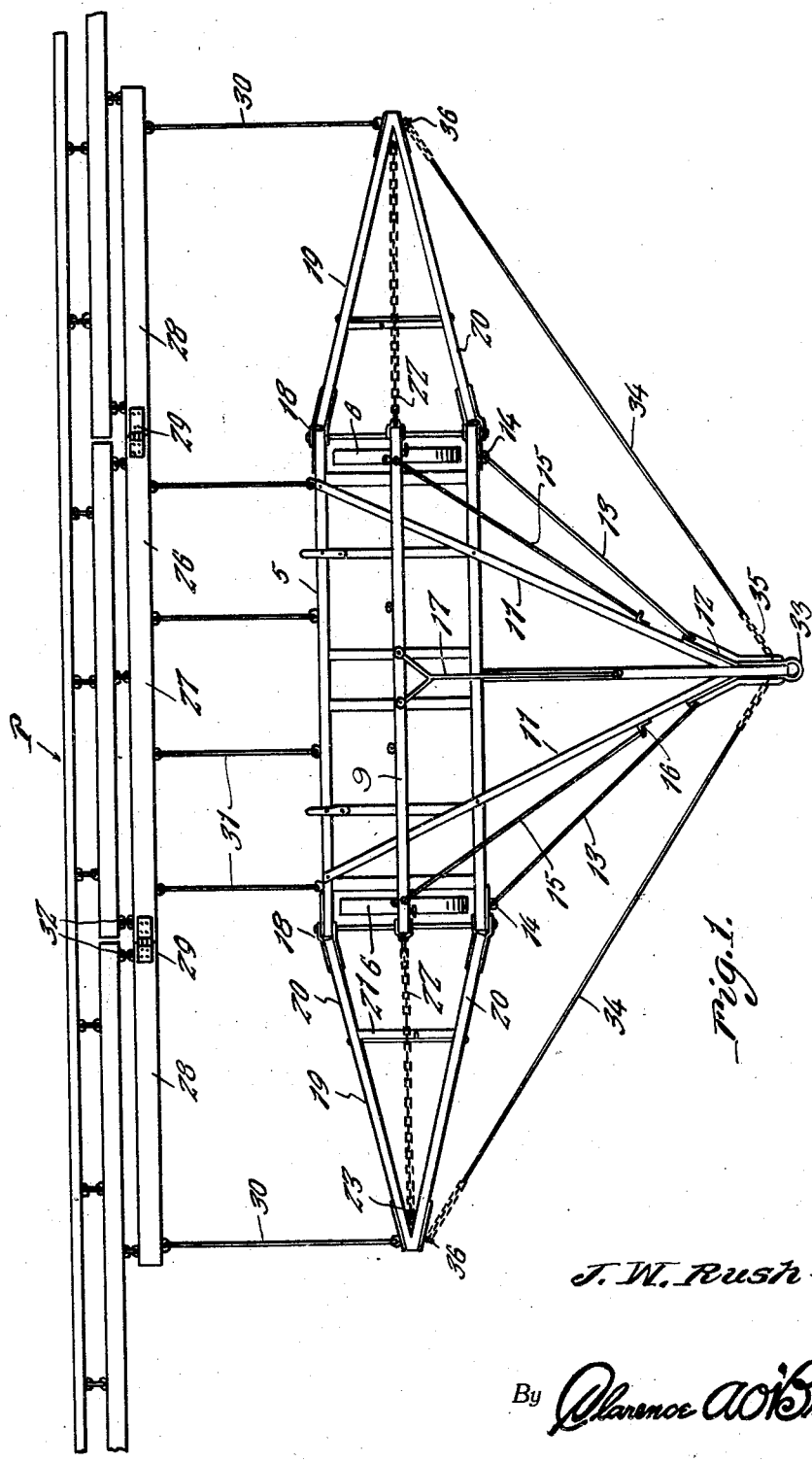
Inventor
J. W. Rush
By Clarence A. O'Brien
Attorney

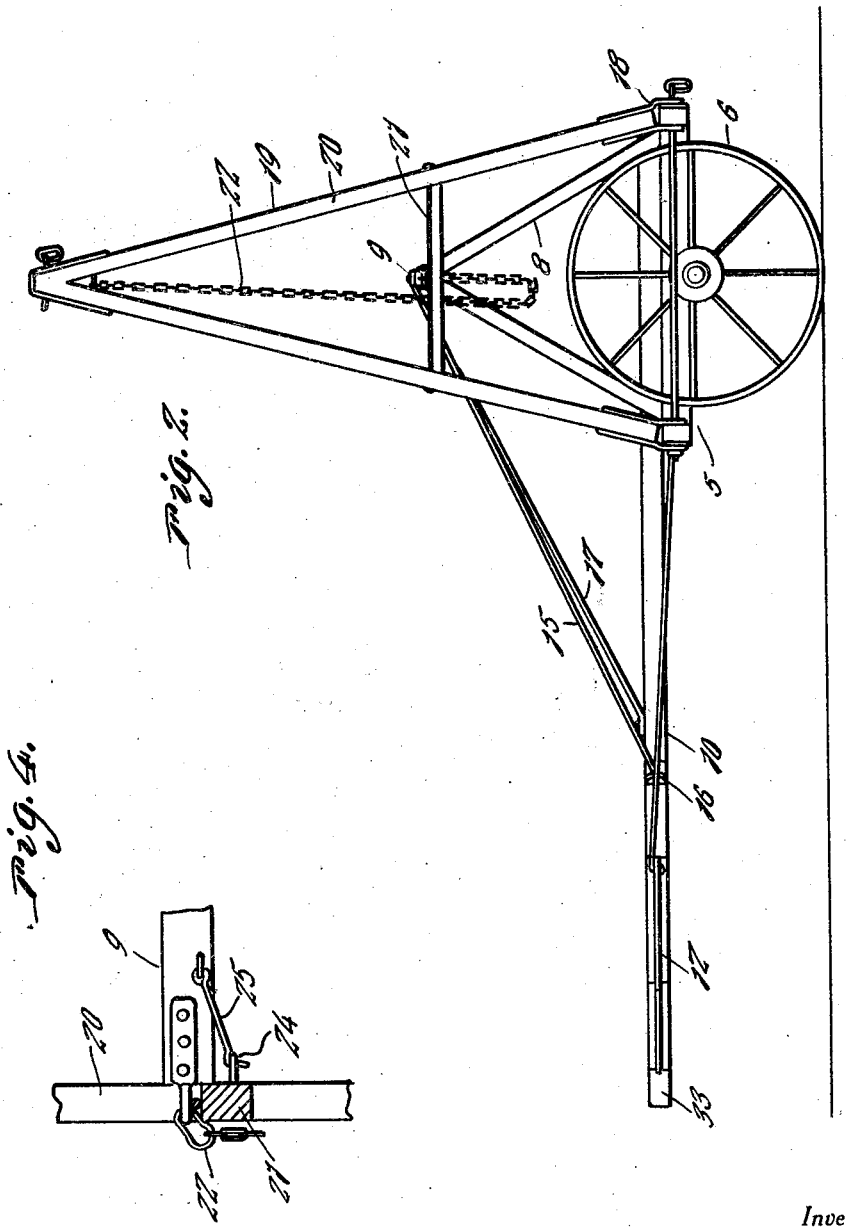

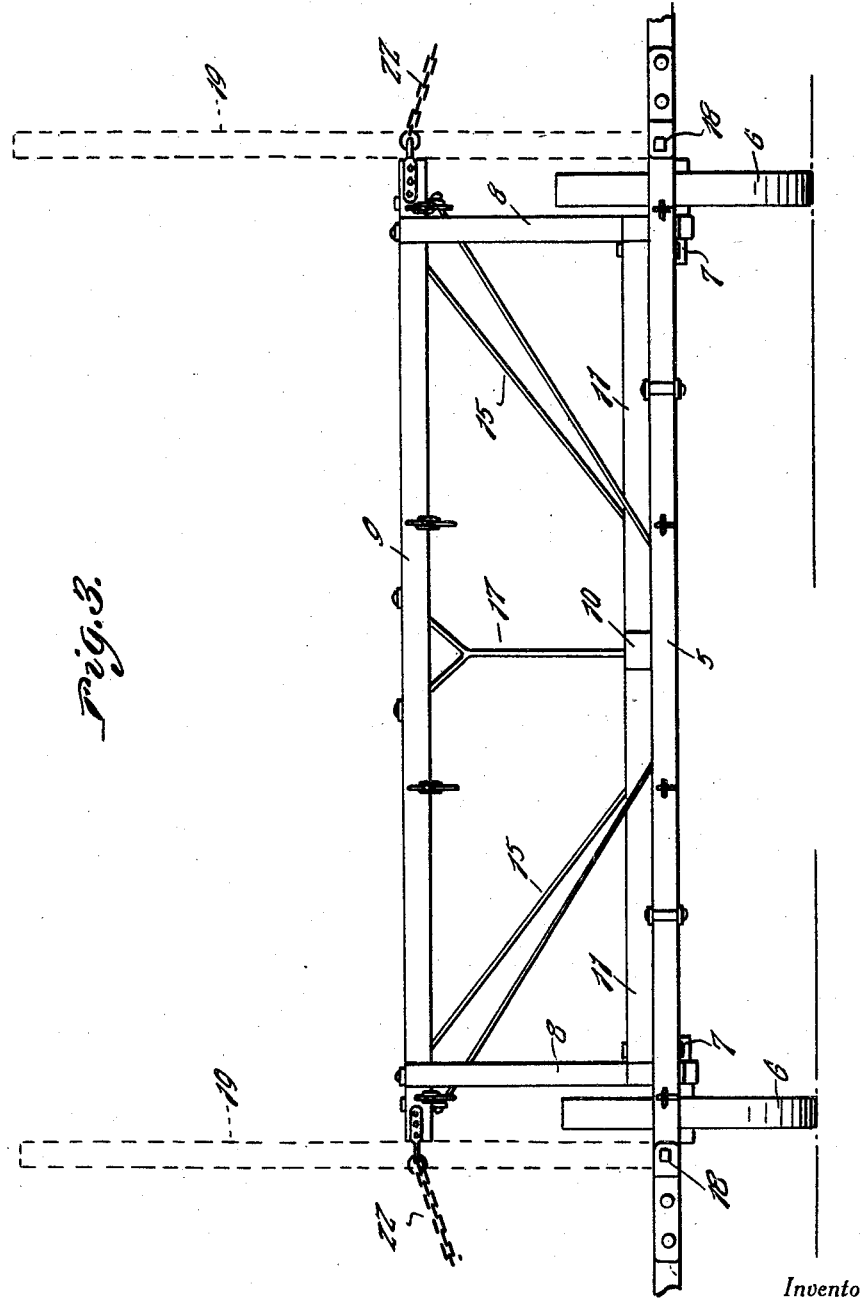

Patented May 5, 1931

1,803,770

UNITED STATES PATENT OFFICE

JOHN W. RUSH, OF LA GRANDE, OREGON

TRACTOR HITCH FOR FARM MACHINERY

Application filed September 10, 1929. Serial No. 391,527.

This invention relates to a tractor hitch for use in coupling farm machinery to a tractor to be drawn by the tractor.

The primary object of this invention is to provide an extensible wheel supported hitch adapted to be secured to the rear of a tractor, and to which in turn, farm machinery such as a spring toothed harrow, a spiked tooth harrow, disc harrows, and the like may be secured whereby the farm machinery may be drawn by the tractor.

A still further object of the invention is to provide a hitch of this character which when interposed between the tractor and the farm machinery to be drawn by the tractor will not require any long swinging movements of the tractor in making a turn, and a still further object of the invention being in the provision of a hitch of this nature consisting mainly in a wheeled frame from opposite ends of which extend pivotally mounted wings, which wings are adapted to be swung upwardly to vertical positions so as to greatly reduce the width of the hitch to enable the same to pass through a gate or to be suitably stored or put away in a building or machine shed without occupying a relatively great amount of space.

A still further object of the invention is to provide a hitch of this nature which is simple in construction, consists of but comparatively few parts, and requires but the need of two wheels for supporting the same.

Other objects and advantages of the invention will become apparent during a study of the following description, taken in connection with the accompanying drawings, wherein:

Figure 1 is a top plan view of the hitch constructed in accordance with the present invention and showing the means of securing a harrow thereto.

Figure 2 is a side elevation of the hitch showing the wings in vertical or folded positions.

Figure 3 is a rear elevation of the hitch.

Figure 4 is a framentary detail view showing the locking means for securing the wings in vertical positions.

With reference more in detail to the drawings, it will be seen that my improved tractor hitch comprises an intermediate or main frame designated generally by the reference character 5. As shown, the main frame 5 is of substantially elongated rectangular configuration, and is supported through the medium of wheels 6—6 journalled in opposite ends of the frame on stub axle shafts 7.

At its said opposite ends, the frame is provided with substantially inverted V-shaped upstanding brackets 8—8. A horizontal connecting bar 9 extends longitudinally of the frame above the frame, and this bar adjacent its opposite ends is secured to the V-shaped brackets 8 at the apex of the brackets as clearly shown in Figures 2 and 3.

The frame is further provided with a draft tongue 10 extending forwardly therefrom intermediate the ends of the frame. Suitable brace rods 11—11 are secured at one end rearwardly of the frame inwardly from the opposite ends of the frame, and these brace bars converge forwardly toward one another and are secured to the forward end of the draft tongue 10 as is apparent from a study of Figure 1. The said brace bars 11—11 are secured to the forward end of the tongue through the medium of suitable angularly bent angle irons 12. Links 13—13 have one end thereof engageable with the inner ends of the anglebars 12, while at their opposite ends the links are receivable in eyes 14 secured in the frame 5 adjacent the ends of the frame.

Additional brace rods 15 are secured at one end in angle brackets 16 carried by the brace rods 11 at the forward ends of the rods rearwardly of the angle bars 12. At their outer ends the brace rods 15 are rigidly secured to the horizontal connecting rod 9 at the opposite ends of the connecting bar. A cross member 17 has the shank thereof at one end secured to the draft tongue 10 intermediate the ends of the tongue, while the legs of the fork are rigidly secured to the horizontal connecting bar 9 intermediate the ends of the bar as shown to advantage in Figure 1.

Hingedly connected to the main frame 5 at opposite ends of the frame through the medium of suitable hinge joints 18 are substantially V-shaped wing frames designated generally by the reference character 19—19. The wing frames 19 are connected at their widest ends to the ends of the frame 5, the ends of the legs 20—20 of the respective frames being secured to the complemental portion of the hinges 18. The legs 20 of each of the frames 19 are connected intermediate their ends through the medium of a cross bar 21 of angleiron construction.

The frames 19 when in a lowered or unfolded position extend laterally from the frame in a horizontal plane, the inner ends of the legs 20 of the respective frames abutting the ends of the frame 5, thus limiting the downward movement of the frames 19 whereby they may assume this horizontal position. The wing frames 19 are adapted to be swung up to a horizontal position substantially parallel to the V-shaped brackets 8.

For further limiting the downward swinging movement of the frames 19 and at the same time maintaining the same in a substantially horizontal position, there is provided elongated chains or similar flexible members 22 each of which are secured at one end to opposite ends of the connecting bar 9, while at their other ends, said chains 22 are secured to the frames 19 at the apex of the frames as at 23.

The cross members 21 of the respective frames are so positioned intermediate the ends of the frames that when said frames 19 are swung to a vertical position, these cross members 21 will be positioned against the adjacent end of the connecting bar 9. Each of the cross members are provided on their inner face with an eye 24 while a hook 25 is pivoted to the connecting member 9 at each end thereof and the hooks 25 are adapted to be received in the eye 24 for maintaining the frames 19 in a vertical position.

The invention further comprehends the provision of a sectional draft bar designated generally by the reference character 26. The sectional draft bar comprises an intermediate section 27 and a pair of end sections 28 hinged at their inner ends to the ends of the intermediate section 27 as at 29—29. Obviously, when not in use the end sections may be folded inwardly upon one another against the intermediate section 27.

In this connection, it may be also well to mention that the intermediate section 27 of the draft bar is of a length substanially equal of the length of the main frame 5. The end sections 28 of the draft bar correspond somewhat to the wings 19 in length, and said end sections at their outer ends are secured to the outer ends of the wing frames 19—19 rearwardly of the tractor hitch through the medium of links 30—30.

The intermediate section 27 of the draft bar is connected to the rear longitudinal side of the main frame 5 through the medium of a plurality of spaced links 31. Obviously the link connections 30 and 31 will permit of certain play being given to the sectional draft bar which is desirable. Secured to the sections of the draft bar 26 and in a flexible manner through the medium of chains or any other connecting medium 32 may be a gang plow designated generally by the reference character P.

In practice, the draft tongue 10 is provided at its outer end with suitable means or coupling 33 adapted to be coupled to the rear of a tractor, and the wing frames 19 are disposed in a horizontal position while the sectional draft bar 26 is extended or unfolded and to this the gang plow P or any other suitable farm implement may be suitably secured to be drawn thereby.

Obviously when not in use, the sectional draft bar, through the medium of the link connections 30 and 31 may be disengaged from the main frame and wings 19 and the wings then folded so as to assume vertical positions, the cross bars of the wing frames being secured or locked through the medium of the eye 24 and hook 25 on the end of the connecting bar 9 for maintaining such positions.

Manifestly, the width of the entire tractor hitch will then be greatly reduced and but little space will then be occupied by the tractor hitch when the same is stored in a shed or barn or other suitable housing.

It is to be also noted that a pair of cables 34 are provided at opposite ends with small chains 35, the chains 35 on one end of each of the cables being secured to the draft tongue 10 adjacent the coupling 33, while the chains 35 on the opposite ends of each of the cables 34 are secured as at 36 to the wing frames 19 at the smaller or outer ends of the frame.

It is believed that from the foregoing, taken in connection with the drawings, a clear understanding of the construction, operation, and advantages of a hitch of this character will be had by those sufficiently skilled in this art, and a more detailed description thereof is therefore deemed unnecessary.

Even though I have herein shown and described the preferred embodiment of my invention, it is to be understood that the same is susceptible to changes fully comprehended by the spirit of the same as herein described, and the scope of the appended claims.

Having thus described my invention, what I wish to claim is:

1. In a hitch of the class described, a main frame, wheels supporting said main frame at each end of the frame, wing frames hingedly connected to said main frame at opposite ends of the main frame, and adapted to extend laterally from said main frame, said wing frames adapted to be swung upwardly to assume vertical positions, means for securing said wing frames in said vertical positions, a draft tongue extending forwardly from said main frame intermediate the ends of said main frame, brace bars secured to the main frame and said draft tongue, brace rods secured to said main frame at opposite ends of the main frame and said draft tongue at the forward end of said draft tongue, a pair of flexible members secured at one end to the forward end of said draft tongue, and at their opposite ends to the free ends of said wing frames, a sectional draft bar, said draft bar comprising an intermediate section and a pair of end sections, means hingedly connecting the end sections of the draft bar to said intermediate section of the draft bar, links extending rearwardly of said main frame, said links adapted to be secured to the intermediate section of said draft bar, links extending rearwardly from the free ends of said wing frames, said last mentioned links adapted to be secured to the outer free ends of said end sections of the draft bar.

2. In a hitch for farm machinery, a main frame, wheels supporting said main frame at each end of said frame, a draft bar extending forwardly from said main frame intermediate the ends of the frame, said draft bar adapted to be connected to the rear end of a tractor, brackets rising from opposite ends of said main frame, a horizontal connecting bar secured at opposite ends to said brackets, brace rods extending from said main frame to said draft tongue, additional brace rods extending from said connecting bar to said draft tongue, a pivotally mounted frame carried by said main frame at each end of said main frame, flexible members secured at one end to each end of said connecting bar, said flexible members being connected at their other ends to the free ends of the last mentioned frames, said pivotally mounted frames adapted to be swung to vertical positions, means for detachably securing said last mentioned frames to said connecting bar when said last-mentioned frames are in vertical positions and sectional means carried by said main frame to facilitate the attachment of farm machinery to said hitch.

3. In a hitch for farm machinery, a main frame, wheels supporting said main frame at each end of said frame, a draft bar extending forwardly from said main frame intermediate the ends of the frame, said draft bar adapted to be connected to the rear end of a tractor, brackets rising from opposite ends of said main frame, a horizontal connecting bar secured at opposite ends to said brackets, brace rods extending from said main frame to said draft tongue, additional brace rods extending from said connecting bar to said draft tongue, a pivotally mounted frame carried by said main frame at each end of said main frame, flexible members secured at one end to each end of said connecting bar, said flexible members being connected at their other ends to the free ends of the last mentioned frames, said pivotally mounted frames adapted to be swung to vertical positions, means for detachably securing said last mentioned frames to said connecting bar when said last-mentioned frames are in vertical positions, and sectional means carried by said main frame to facilitate the attachment of farm machinery to said hitch, said sectional means comprising an intermediate section and a pair of end sections hingedly connected to said intermediate section, a plurality of links connected at one end to the intermediate section and at their opposite ends to said main frame rearwardly of said main frame, and a link connecting each of said end sections to said pivotally mounted frame.

In testimony whereof I affix my signature.

JOHN W. RUSH.